(12) United States Patent
Sekiguchi et al.

(10) Patent No.: US 8,570,334 B2
(45) Date of Patent: Oct. 29, 2013

(54) IMAGE PROCESSING DEVICE CAPABLE OF EFFICIENTLY CORRECTING IMAGE DATA AND IMAGING APPARATUS CAPABLE OF PERFORMING THE SAME

(75) Inventors: Hiroyoshi Sekiguchi, Kanagawa (JP); Ryosuke Kasahara, Kanagawa (JP); Xue Li, Kanagawa (JP)

(73) Assignee: Ricoh Company, Limited, Toyko (JP)

( * ) Notice: Subject to any disclaimer, the term of this patent is extended or adjusted under 35 U.S.C. 154(b) by 313 days.

(21) Appl. No.: 12/805,578

(22) Filed: Aug. 6, 2010

(65) Prior Publication Data
US 2011/0050714 A1 Mar. 3, 2011

(30) Foreign Application Priority Data
Sep. 3, 2009 (JP) ................. 2009-204054

(51) Int. Cl.
*G09G 5/39* (2006.01)

(52) U.S. Cl.
USPC ........................................ 345/531; 348/390.1

(58) Field of Classification Search
None
See application file for complete search history.

(56) References Cited

U.S. PATENT DOCUMENTS

| | | | |
|---|---|---|---|
| 6,369,818 B1 | 4/2002 | Hoffman et al. | |
| 7,925,860 B1 * | 4/2011 | Juffa et al. | 712/10 |
| 2002/0012006 A1 * | 1/2002 | Yamada et al. | 345/660 |
| 2003/0030728 A1 * | 2/2003 | Kudo | 348/208.6 |
| 2004/0095356 A1 * | 5/2004 | Inoue et al. | 345/531 |
| 2004/0146202 A1 | 7/2004 | Hyoki | |
| 2004/0202380 A1 | 10/2004 | Kohler et al. | |
| 2006/0181550 A1 | 8/2006 | Nohara | |
| 2006/0209958 A1 * | 9/2006 | Rangam et al. | 375/240.16 |
| 2008/0100929 A1 | 5/2008 | Hara | |
| 2009/0002523 A1 | 1/2009 | Maekawa | |
| 2009/0021532 A1 * | 1/2009 | Gloege et al. | 345/647 |

FOREIGN PATENT DOCUMENTS

| | | |
|---|---|---|
| EP | 0 375 053 | 6/1990 |
| JP | 2002-016833 | 1/2002 |
| JP | 2006-227297 | 8/2006 |
| JP | 2008-092602 | 4/2008 |
| JP | 2008-118306 | 5/2008 |
| JP | 2009-10730 | 1/2009 |

OTHER PUBLICATIONS

European Search Report dated Oct. 27, 2010 issued in corresponding European Application No. 10172919.2.
Lin Qiang et al., "FPGA Implementation of Piplined Architecture for Optical Imaging Distortion Correction", *IEEE Workshop on Sig. Proc. Sys. Des. & Implementation*, pp. 182-187 (Oct. 4, 2006).
Office Action for corresponding Japanese Application No. 2009-204054 dated Apr. 24, 2013.

\* cited by examiner

*Primary Examiner* — Kee M Tung
*Assistant Examiner* — Ryan D McCulley
(74) *Attorney, Agent, or Firm* — Harness, Dickey & Pierce (57) ABSTRACT

An image processing device includes a memory interface to read out image data from a memory, and a memory access controller to control reading process of the memory interface so as to keep a number of pixels in a main scanning direction of the image data read out from the memory smaller than a number of pixels in a main scanning direction of a screen to which the image data is output.

15 Claims, 7 Drawing Sheets

IMAGE PROCESSING DEVICE CAPABLE OF EFFICIENTLY CORRECTING IMAGE DATA AND IMAGING APPARATUS CAPABLE OF PERFORMING THE SAME

CROSS-REFERENCE TO RELATED APPLICATIONS

This patent application is based on and claims priority under 35 U.S.C. §119 to Japanese Patent Application No. 2009-204054, filed on Sep. 3, 2009, in the Japanese Patent Office, the entire disclosure of which is hereby incorporated herein by reference.

FIELD OF THE INVENTION

The present invention generally relates to an image processing device and an imaging apparatus provided with the image processing device, and more specifically to an image processing device and an imaging apparatus for a camera system such as an automobile camera system.

BACKGROUND

An automobile camera system is usually provided with a wide-angle lens such as a fisheye lens to capture an image of an object in a wider range of area. Since the image produced by the wide-angle lens is more susceptible to distortion, the camera system applies image processing to correct distortion in the captured image using an image processing device that is usually incorporated in the camera system. The image processing device receives the captured image in the form of image data from a sensor unit, and stores the image data in a memory such as a static random access memory (SRAM) or dynamic random access memory (DRAM). At the time of outputting the captured image through a display of the camera system, the image processing device accesses a specific address in the memory to produce the image data in which distortion is corrected. For example, as described in Japanese Patent Application Publication No. 2008-092602A, distortion in the captured image is corrected by calculating the value of the specific address for access using parameter information previously stored, and accessing the calculated specific address to obtain the corrected image data. This method of calculating the specific address for access and accessing the calculated specific address may also be used to produce deformed image data that may be sometimes requested by a user of the camera system.

In order to produce the corrected image data or the deformed image data in real time, the image processing device is required to calculate the value of the specific address for access with high processing speed. This, however results in an increase in manufacturing cost for the camera system, as a high-performance memory tends to be high in cost as well.

SUMMARY

Example embodiments of the present invention include an image processing device capable of providing corrected or deformed image data in real time with high image quality, even when a high-performance memory is not available.

In one example, the image processing device includes a memory interface to read out image data from a memory, and a memory access controller to control reading process of the memory interface so as to keep a number of pixels in a main scanning direction of the image data read out from the memory to be smaller than a number of pixels in a main scanning direction of a screen to which the image data is output.

Further, the image processing device is provided with an image expander that expands the image data read out from the memory such that the number of pixels in the main scanning direction of the image data read out from the memory is increased to the number of pixels in the main scanning direction of the screen.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
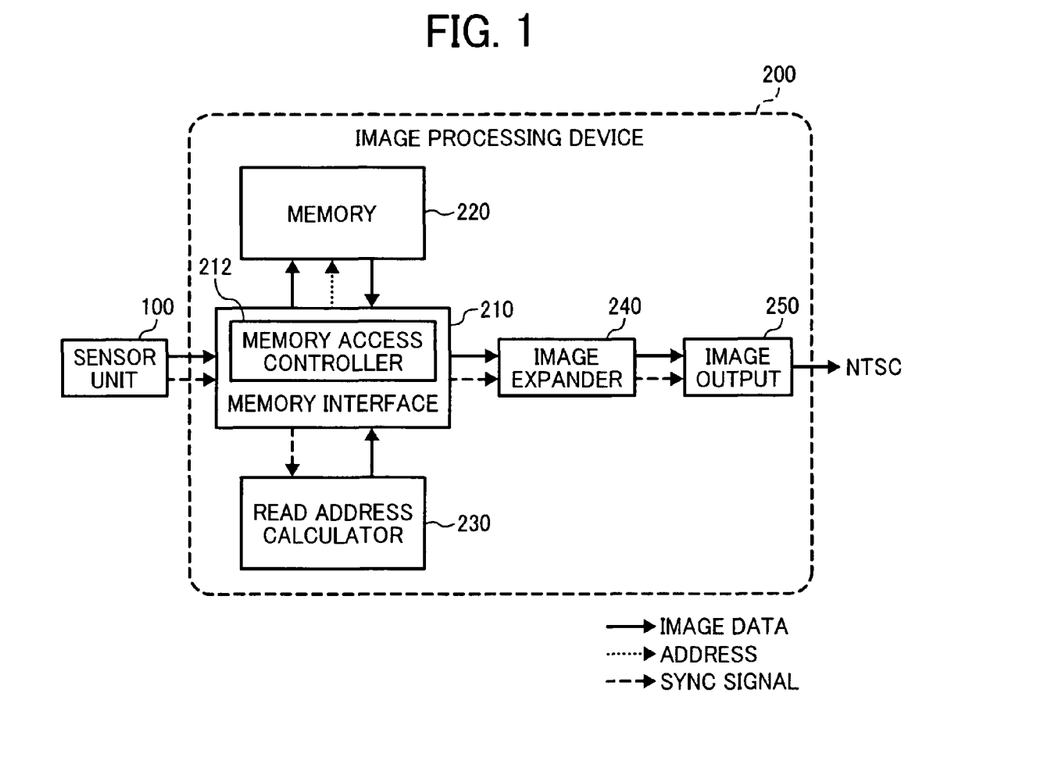
FIG. 1 is a schematic diagram illustrating a structure of an imaging apparatus including a sensor unit and an image processing device, according to an example embodiment of the present invention.

Referring now to FIG. 1, a structure of an imaging system is explained according to an example embodiment of the present invention.

The imaging system of FIG. 1 includes a sensor unit 100 including an imaging element, and an image processing device 200 that processes image data output from the sensor unit 100. For example, the imaging system of FIG. 1 may be implemented as an automobile camera system. In such case, the sensor unit 100 and the image processing device 200 are accommodated in a case, which may be installed onto a backside portion of an automobile, for example, at a rear window of the automobile. Although not shown in FIG. 1, the image processing device 200 is connected to a display device such as a monitor. The display device may be provided inside the automobile to display the image output from the image processing device 200 to a driver who is driving the automobile.

The sensor unit 100 captures an image of an object to generate an analog signal, and converts the analog signal to a digital signal. The digital signal is output as image data to the image processing device 200. The sensor unit 100 outputs horizontal and vertical synchronization signals, which may be collectively referred to as a synchronization signal, to the image processing device 200.

Figure 2:
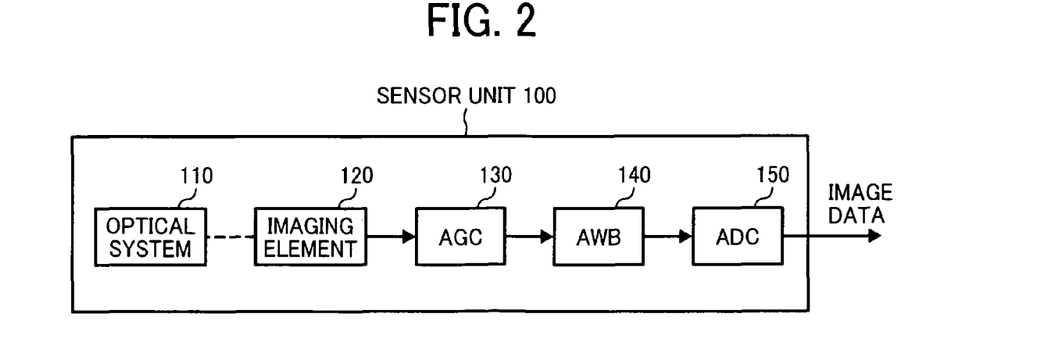
FIG. 2 is a structure of a sensor unit of the imaging apparatus of FIG. 1.

FIG. 2 illustrates an example structure of the sensor unit 100. The sensor unit 100 mainly includes a lens optical system 110, imaging element 120, automatic gain control (AGC) circuit 130, an automatic white balance (AWB) circuit 140, and an analog digital converter (ADC) 150.

The optical system 110 focuses lights onto the imaging element 120. In case of automobile camera system, the optical system 110 is generally provided with a wide-angle lens with large aberration difference. The imaging device 120, which may be implemented by a charged coupled device (CCD) image sensor or a complementary metal-oxide semiconductor (CMOS) image sensor, converts the optical image generated by the optical system 110 into an electric analog signal having high and low levels according to the intensity levels of the optical image.

The analog signal of the captured image, which is obtained by the imaging device 120, passes through the AGC circuit 130 and the AWB circuit 140 to the ADC 150. At the ADC 150, the analog signal is converted to the digital data. The AGC 130 is a circuit that outputs a signal having a desired level, which is to be input to a National Television System Committee (NTSC) encoder. More specifically, the gain of the amplifier is reduced as the object receives more light, and the gain of the amplifier is increased to a predetermined level as the object receives less light. Since noise tends to increase as the gain increases, S/N ratio of the signal is reduced to suppress the increase in S/N ratio. The AWB circuit 140 corrects the gain of each color channel such that the signal intensity of each color is kept equal for an object of white color. The ADC 150 converts the analog signal to the digital data for each color. The digital data may be 8-bit data of respective colors, which may be collectively referred to as the image data.

Although not shown in FIG. 2, the sensor unit 100 incorporates therein a synchronization signal generator, which generates a synchronization signal. Processing performed by devices of the sensor unit 100 is thus made in synchronization with one another according to the synchronization signal generated by the synchronization signal generator. As illustrated in FIG. 1, the sensor unit 100 outputs the synchronization signal with the image data. Alternatively, the synchronization signal generator may be provided separately from the sensor unit 100 and outputs the synchronization signal to the sensor unit 100 and the image processing device 200.

Referring back to FIG. 1, the image processing device 200 mainly includes a memory interface 210, a memory 220, a read address calculator 230, an image expander 240, and an image output 250. The memory interface 210 is provided with a memory access controller 212. Although not shown in FIG. 1, the image processing device 200 further includes a color space converter, a modulation transfer function (MTF) correction circuit, and a gamma correction circuit.

The memory interface 210 receives the image data output from the sensor unit 100, and stores the received image data in the memory 220 at least temporarily. In this example, the memory 220 may be implemented by a frame buffer such as a DRAM capable of storing image data of more than one frame. In this example, one-frame image data and one-screen image data may be exchangeably used. The image data stored in the memory 220 is read out by the memory interface 220, based on a read address that is determined based on the transformed image data to be output to the display device. The read address is calculated by the read address calculator 230.

Figure 3:
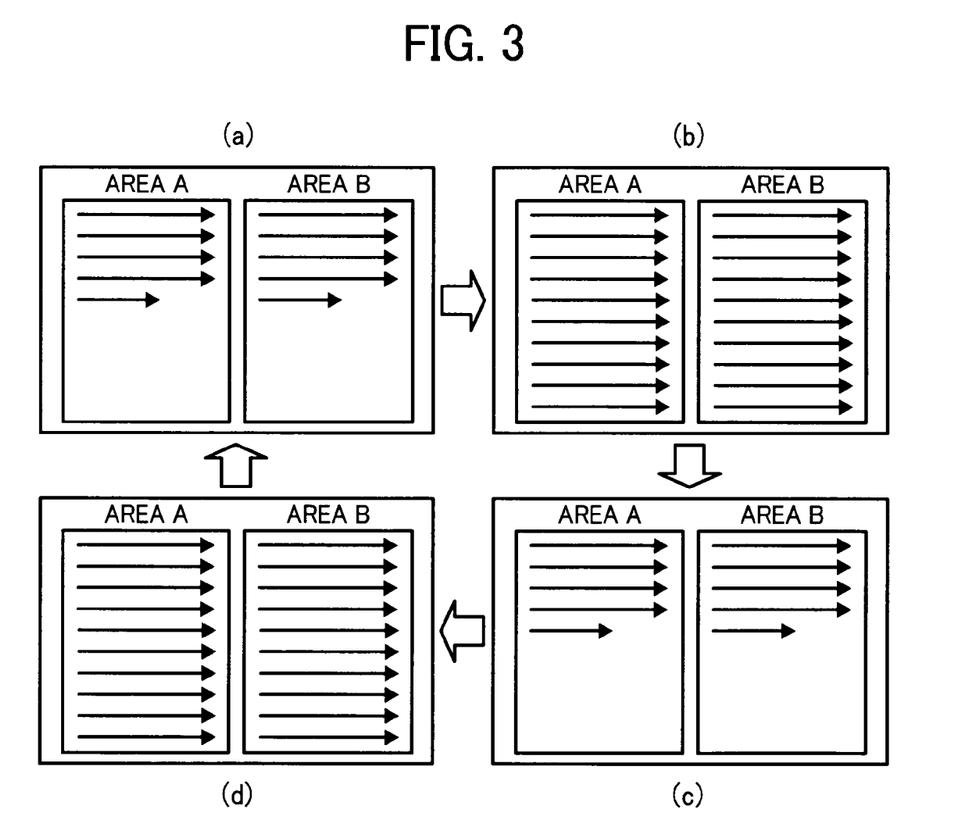
FIG. 3 is an illustration for explaining operation of reading image data from or writing image data into a memory using a double-buffer method.

In this example, the image data is read out from or written into the memory 220 using a double-buffer method. For the illustrative purpose, as illustrated in FIG. 3, it is assumed that the image data of two frames, i.e., the image data of two screens, are to be stored respectively in an area A and an area B of the memory address space in the memory 220. As illustrated in FIG. 3(a), while the one-frame image data is being read out from the area A of the memory address space, the one-frame image data received from the sensor unit 100 is stored onto the area B of the memory address space. In other words, the area A functions as an address space for reading, and the area B functions as an address space for writing. As illustrated in FIG. 3(b), when all addresses are accessed for both of the areas A and B, the reading and writing functions of the area A and the area B are reversed. More specifically, as illustrated in FIG. 3(c), the one-frame image data is written onto the area A of the memory address space, while the one-frame image data is read out from the area B of the memory address space. As illustrated in FIG. 3(d), when all addresses are accessed for both of the areas A and B, the writing and reading functions of the area A and the area B are reversed so as to repeat the processes illustrated in FIGS. 3(a) to 3(d).

Referring to FIG. 3, when reading and writing of the image data are processed at the same speed, for example, at 30 frames per second (fps), the functions of the area A and the area B are to be exchanged every one frame of the image data. Alternatively, the reading and writing of the image data may not be processed under the same speed. For example, when the speed of reading the image data is 30 fps and the speed of writing the image data is 15 fps, the one-frame image data may be accessed by the reading process even writing of that image data is not completed by the writing process, causing an image lag on the screen. In order to reduce the image lag, the one-frame image data that has been once read by the reading process may need to be read again until the writing process completes writing of the one-frame image data. In case of reading the image data using the interlacing method, the image data is read every second line, for example, by reading a first field containing all the odd lines in the image data first, and reading a second field containing all the even lines of the image data after reading the first field. The interlacing method may be used to suppress flickering on the screen.

In this example, the memory access controller 212 controls operation of reading the image data from the memory 220 such that the number of pixels being read out from the memory 220 in the main scanning direction of the image data is kept smaller than the number of pixels in the main scanning direction of the image data to be output through the screen of the display device.

The read address calculator 230 calculates a read address that is determined based on the transformed image data. The memory interface 210 accesses the read address in the memory 220 to read out the image data in a desired form. More specifically, the calculated read address is used to convert the image data that is input to the memory 220 ("the input image data") through coordinate conversion to generate output image data to be output from the memory 220 ("the output image data"). The read address calculator 230 calculates a coordinate value of each pixel in the input image data that corresponds to each pixel in the output image data.

Figure 4A:
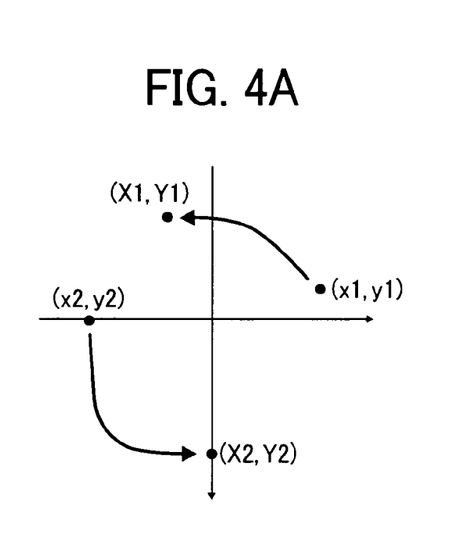
FIG. 4A is an illustration for explaining rotation of image data performed through coordinate conversion.
Figure 4B:
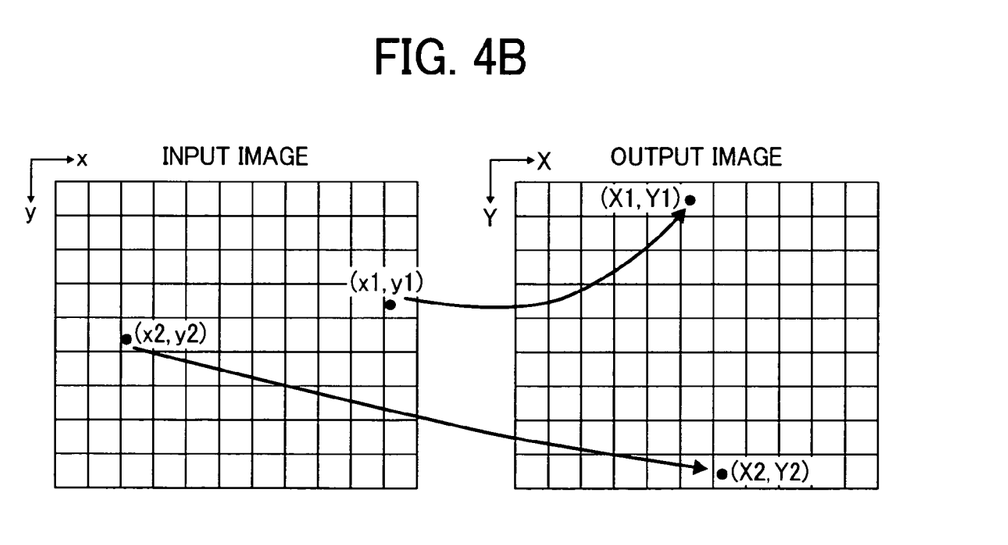
FIG. 4B is an illustration showing the difference in coordinate value between input image data that is stored in a memory and output image data that is read out from the memory.

FIGS. 4A and 4B are an illustration for explaining process performed by the read address calculator 230. FIGS. 4A and 4B specifically illustrate an example in which the input image data is rotated by 90 degrees to generate the output image data.

Referring to FIG. 4A, it is assumed that a first pixel that is located at the coordinate (x1, y1) of the input image data is moved to the coordinate (X1, Y1) of the output image data through coordinate conversion, and a second pixel that is located at the coordinate (x2, y2) of the input image data is moved to the coordinate (X2, Y2) of the output image data through coordinate conversion. FIG. 4(b) illustrates the difference in coordinate values of each pixel between the input image data that is input to the memory 210 and the output image data that is output from the memory 210.

At the time of outputting the first pixel of the image data for display, the read address calculator 230 determines which pixel in the input image data corresponds to the first pixel of the output image data, and obtains a coordinate value of the pixel of the input image data that corresponds to the first pixel of the output image data as the read address of the first pixel of the output image data. Based on the calculated read address, the first pixel located at the coordinate (x1, y1) in the input image data is read as the first pixel located at the coordinate (X1, Y1) in the output image data. Similarly, at the time of outputting the second pixel of the image data for display, the read address calculator 230 determines which pixel in the input image data corresponds to the second pixel of the output image data, and obtains a coordinate value of the pixel of the input image data that corresponds to the second pixel of the output image data as the read address of the second pixel of the output image data. Based on the calculated read address, the second pixel located at the coordinate (x2, y2) in the input image data is read as the second pixel located at the coordinate (X2, Y2) in the output image. For each pixel of the output image data, the memory interface 210 accesses an address in the memory 220 that is specified by the read address calculated by the read address calculator 230 to obtain the pixel corresponding to the pixel of the output image data, and outputs the output image data that is the input image data rotated by 90 degrees.

The read address calculator 230 is implemented as a large scale integration (LSI) circuit. In case of automobile camera system, the image data that is stored in the memory 220 may need to be converted or transformed in various ways before being output depending on the user need. Examples of image processing to be performed upon user request include, but not limited to, distortion correction, image rotation, and image processing to create the bird's eye view. In order to reduce a development cost and a circuit size of LSI, LSI is designed to provide only the processing that is common for all types of output image data, such as bilinear interpolation. In order to generate the output image data of different types, a plurality of coordinate conversion tables that respectively correspond to a plurality of types of output image data may be prepared and stored in a memory, such as programmable read only memory (PROM). For example, the plurality of coordinate conversion tables may be prepared in the form of lookup tables, which may be provided by software.

Accordingly, in one example, the read address calculator 230 includes a PROM that stores a plurality of types of coordinate conversion tables, and an LSI that provides a coordinate conversion function, for example, by applying bilinear interpolation using at least one of the coordinate conversion tables.

In order to prepare a coordinate conversion table, the output image data is divided into a plurality of blocks, and a sampling pixel is selected from each block of the plurality of blocks. The sampling pixel of each block may be, for example, a top pixel to be firstly processed among the pixels contained in the same block. For each one of the sampling pixels obtained respectively for the plurality of blocks of the output image data, a coordinate value of the pixel that corresponds to the sampling pixel in the input image data is obtained and stored in the coordinate conversion table. In this manner, the coordinate conversion table stores a coordinate value of the input image data for each one of the sampling pixels of the divided blocks of the output image data.

Figure 5:
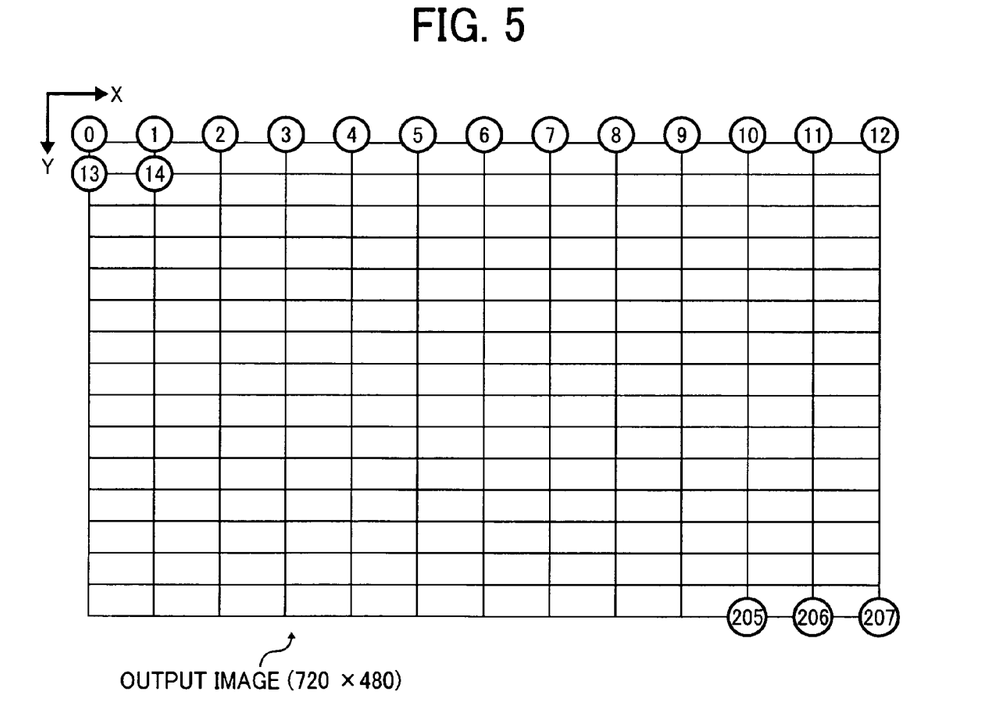
FIG. 5 is an illustration of a plurality of blocks divided from output image data each block having a sampling pixel.

FIG. 5 illustrates an example case of dividing the output image data having an image size of 720 pixels×480 pixels into 12×15=180 blocks, with each block having an image size of 60 pixels×32 pixels. In FIG. 5, the numerals 0 to 205 each indicate a number assigned to the sampling pixel, which is the top pixel, of each block in the output image data. The coordinate conversion table stores, for each number assigned to the sampling pixel, the coordinate value of the sampling pixel in the input image data.

At the time of generating the output image data for display, the LSI, which functions as a coordinate converter, calculates the coordinate value of each pixel of the output image data based on the synchronization signal. When the coordinate value of the pixel to be output matches the coordinate value of the sampling pixel stored in the coordinate conversion table, the LSI enters the number assigned to the sampling pixel into the coordinate conversion table to obtain the coordinate value of the input image data that corresponds to the entered number, and outputs the obtained coordinate value as the read address of the pixel to be output. When the coordinate value of the pixel to be output does not match the coordinate value of the sampling pixel stored in the coordinate conversion table, the LSI specifies a plurality of sampling pixels surrounding the pixel to be output from the coordinate conversation table as reference pixels, and obtains a plurality of coordinate values of the input image data that correspond to the reference pixels that are specified. Based on the obtained plurality of coordinate values, the LSI applies bilinear interpolation to calculate the coordinate value of the input image data that corresponds to the pixel to be output, and outputs the calculated coordinate value as the read address of the pixel to be output.

In alternative to the above-described function or method of obtaining the read address, the read address calculator 230 may obtain the read address in various other ways using any desired known method.

Referring back to FIG. 1, the memory interface 210 sequentially receives the read address from the read address calculator 230 in synchronization with the synchronization signal, and sequentially reads the image data of the read address from the memory 220. At this time, the memory access controller 212 controls the process of reading the image data from the memory 220 such that a number of pixels of the image data being read from the memory 220 in the main scanning direction is kept smaller than a number of pixels to be output to the screen of the display device in the main scanning direction. More specifically, the memory access controller 212 counts a number of pixels of each line of the image data that is being read from the memory 220 to obtain a counted value. When the counted value reaches a predetermined value, the memory access controller 212 causes the memory interface 210 to stop reading of the subjected line of the image data from the memory 220.

For example, assuming that the input image data stored in the memory 220 has an image size of 640 pixels×480 pixels, and the output image data has an image size of 720 pixels×480 pixels, the memory access controller 212 stops the process of reading a line of the image data in the main scanning direction from the memory 220 when the image data of 504 pixels has been read out from the memory 220.

In alternative to counting the number of pixels that have been read out from the memory 220, the memory access controller 212 may count a number of read addresses received from the read address calculator 230 for each line of the image data to obtain a counted value. When the counted value reaches a predetermined value, the memory access controller 212 may instruct the read address calculator 230 to stop calculation of the read address for the rest of the lines of the image data. Accordingly, the number of pixels of the image data being read from the memory 220 in the main scanning direction is kept smaller than the number of pixels to be output to the screen in the main scanning direction.

The image expander 240 receives the output image data read out from the memory 220 by the memory interface 210, and expands or increases the number of pixels in the main scanning direction of the output image data such that the resultant output image data has a desired number of pixels that corresponds to the screen size. For example, the image expander 240 expands the image data using interpolation.

Figure 6A:
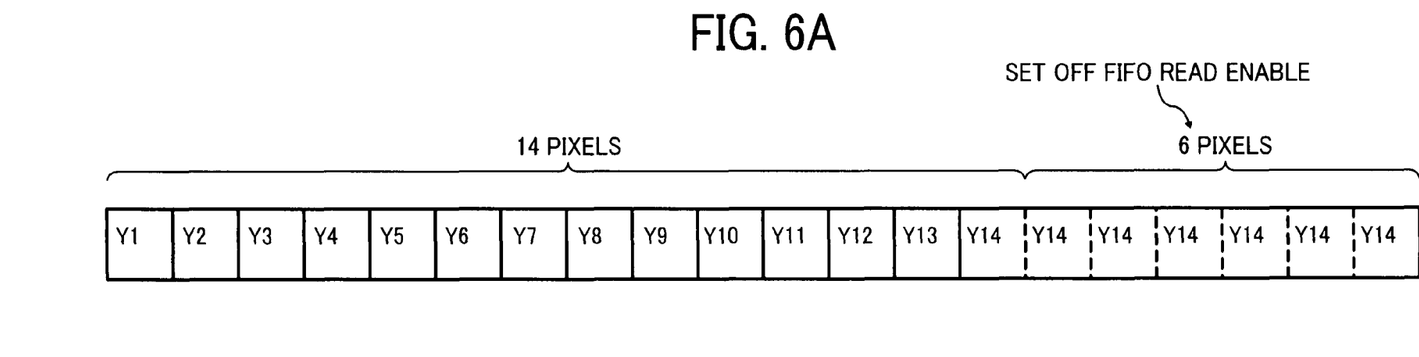
FIG. 6A is an illustration of image data before expansion.
Figure 6B:
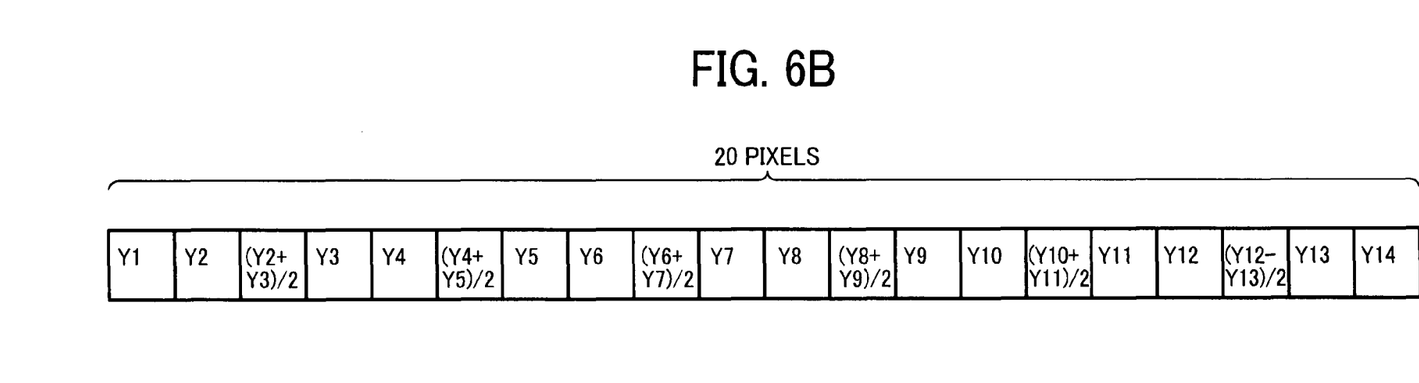
FIG. 6B is an illustration of image data after expansion.

FIGS. 6A and 6B illustrate example operation performed by the image expander 240. In FIGS. 6A and 6B, it is assumed that the number of pixels in the main scanning direction to be output through the screen is 720 pixels, and the number of pixels in the main scanning direction of the image data that is read out from the memory 220 is 504 pixels.

The image expander 240 writes the image data having 504 pixels per one line, which is read out from the memory 220, into, for example, a first-in first-put (FIFO) memory. The image data is then read out from the FIFO memory. The read enable signal, which causes reading of the image data from the FIFO memory, is set to HIGH for 14 clocks, and set to LOW for 6 clocks. This operation of reading 14 pixels of the image data is repeated for 36 times to obtain the image data having 504 pixels per one line. FIG. 6A illustrates a set of image data that is read at one time from the FIFO memory, which is not expanded. The image data set of FIG. 6A is expanded by applying interpolation to generate an image data set of FIG. 6B. By repeating the process of expanding for 36 times, the image data having 504 pixels per one line is expanded to the image data having 720 pixels per one line.

In alternative to the process of expanding illustrated in FIGS. 6A and 6B, the image data may be expanded to obtain the image data having a desired number of pixels in the main scanning direction that corresponds to the screen size in various other ways.

Referring to FIG. 1, the image output 250 receives the image data output from the image expander 240, and encodes the image data to generate the image data in a desired format that corresponds to the screen of the display device. In this example, the image data is converted to an image signal in NTSC, and displayed onto the display device such as the monitor.

Figure 7:
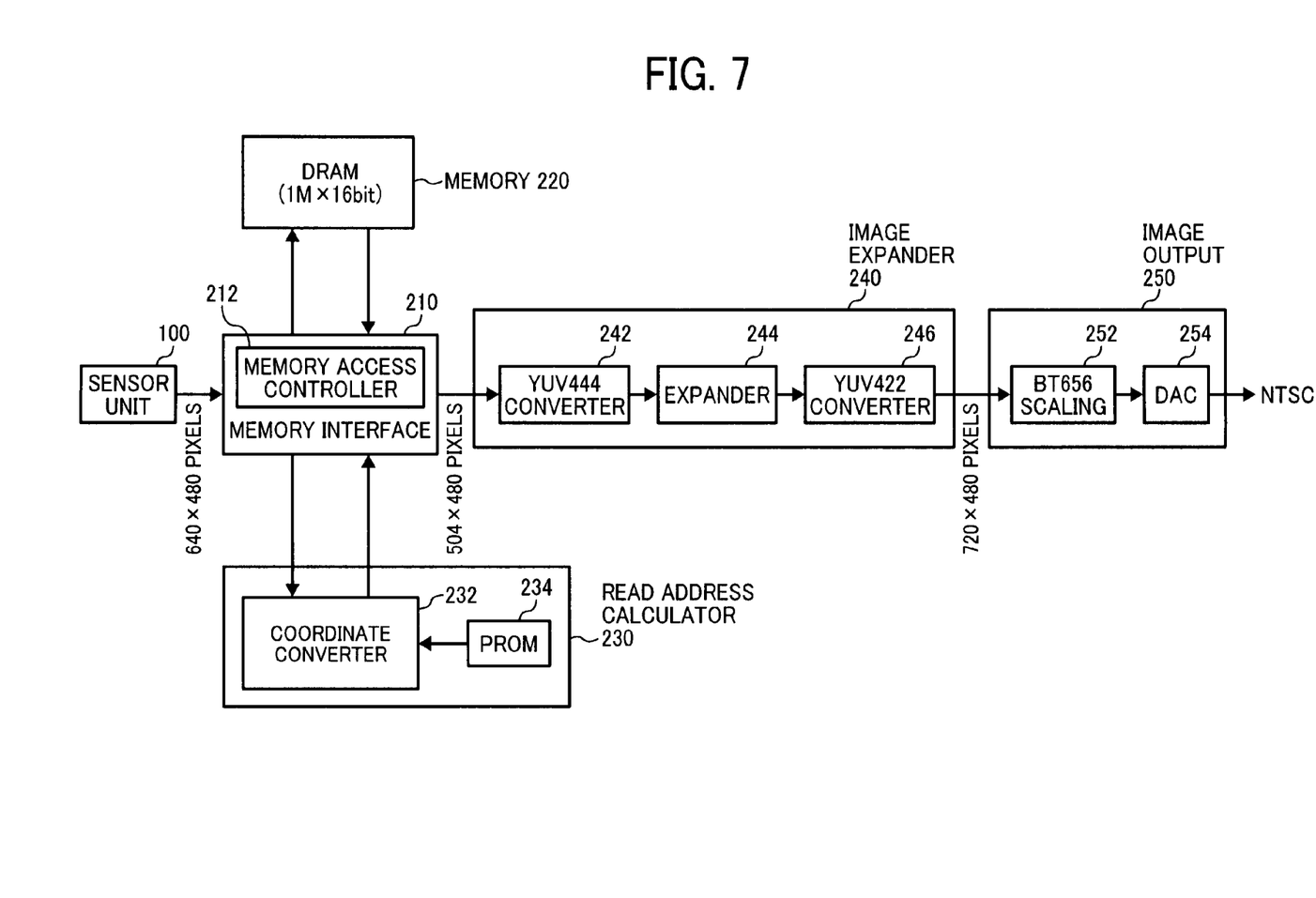
FIG. 7 is a schematic block diagram illustrating a structure of an imaging apparatus including a sensor unit and an image processing device, when the imaging apparatus is implemented as an automobile camera system.

FIG. 7 illustrates an example structure of the imaging apparatus of FIG. 1 having the sensor unit 100 and the image processing device 200, when the imaging apparatus of FIG. 1 is implemented as an automobile camera system.

The sensor unit 100 outputs image data that is obtained by capturing an image of an object from the back side of the automobile. In this example, the 8-bit image data is obtained in YUV 422 format. The sensor unit 100 outputs the image data in the order of Y, U, Y, V, Y, U, Y, V . . . in synchronization with 27 MHz clock signal. The effective size of the image data is 640 pixels by 480 pixels, with the frame rate of 30 fps. The desired size of the output image for display through the screen is 720 pixels by 480 pixels.

The image data output from the sensor unit 100 is stored in the memory 220 via the memory interface 210. The memory 220, which is implemented by DRAM, stores the image data of more than one frame or more than one screen. In this example, the DRAM of the memory 220 has the capability of storing 1M X 16 bit data. When storing the image data in each address, the upper 8 bit image data is stored in the form of luminance signal of 8 bits, and the lower 8 bit image data is stored in the form of color difference signal of 8 bits. As described above referring to FIG. 3, writing and reading of the DRAM is performed using the double-buffer method. The writing process is performed using the progressive method, and the reading process is performed using the interlacing method. The writing process and reading processing are both performed at the speed of 30 fps.

At the time of reading the image data from the memory 220 by the memory interface 210, the read address calculator 230 calculates a read address that is determined based on the output image data that is transformed from the input image data. More specifically, as described above referring to FIG. 1, the read address is used for converting the input image data to the output image data through coordinate conversion. The read address calculator 230 includes a PROM 234, which stores a plurality of coordinate conversion tables respectively prepared for various types of conversion including progressive interface (PI) conversion, distortion correction, rotation, and bird-eye view conversion. For each conversion type, the coordinate conversion table stores a coordinate value of the input image data that corresponds to the sampling pixel of the output image data.

The coordinate converter 232 calculates the coordinate value of the input image data that corresponds to each pixel of the output image data using a selected one of the plurality of coordinate conversion tables stored in the PROM 234, for example, by applying bilinear interpolation, to output the read address of each pixel of the output image data to the memory interface 210. Selection of the coordinate conversion table in the PROM 234 may be determined according to an instruction received from the outside, such as a user instruction.

The memory interface 210 reads out the image data from the memory 220 based on the read address received from the coordinate converter 232. The memory access controller 212 counts the number of pixels in the image data being read out from the memory 220 for each line to obtain a counted value. When the counted value reaches a predetermined value, the memory access controller 212 stops the process of reading such that the following line is not read. In this example, the image data being read out from the memory 220 is 504 pixels per one line.

The image data that is read out from the memory 220 is input to the image expander 240. The YUV 444 converter 242 converts the image data to YUV 444 image data. The expander 244 expands the image data having 504 pixels per line to the image data having 720 pixels in the main scanning direction of the screen. The YUV 422 converter 246 converts the expanded image data to YUV 422 image data. As described above referring to FIGS. 6A and 6B, the expander 244 writes the image data having 504 pixels per one line into the FIFO memory, reads out the image data for 14 pixels at a time, and expands the read image data from 14 pixels to 20 pixels. This operation of reading 14 pixels of the image data and expanding to 20 pixels is repeated for 36 times to obtain the expanded image data having 720 pixels in the main scanning direction of the screen.

The image expander 240 outputs the image data to the image output 250. The BT 656 scaling 252 applies scaling to luminance signal and difference signal of the image data. The DAC 254 converts the image data to an image signal in NTSC. In this example, according to specification of DAC 254, scaling is performed in a manner to be in compliance with BT656. More specifically, the luminance signal and the difference signal are respectively converted to fit in the ranges 16 to 235 and 16 to 240 before being input to the DAC 254.

The image output 250 is connected to an image display device on which the image data according to the image signal output from the DAC 254 is displayed.

Figure 8:
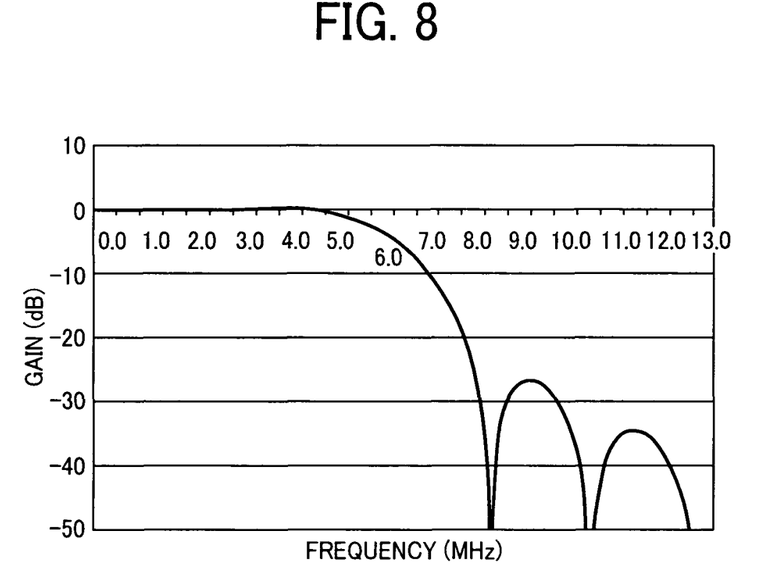
FIG. 8 is a graph showing the frequency characteristics of a luminance signal output by the imaging apparatus of FIG. 7.

FIG. 8 illustrates frequency characteristics of the luminance signal of the image data that is displayed on the image display device connected to the image processing device 200. The horizontal resolution of the NTSC signal output from the image output 250 is calculated to be 8.0 MHz/30 fps/525 line=507. Referring to FIG. 8, even when the image data having 720 pixels per one line is read out from the memory 220, the NTSC signal output is kept at a constant level such that degradation is almost absent at 500 pixels.

As described above, the memory access controller 212 is provided in the image processing device 200, which controls a number of pixels in a main scanning direction of the image data being read out from the memory to be smaller than a number of pixels in a main scanning direction of the image data to be output through the screen. Further, the image expander 240 is provided in the image processing device 200, which expands the image data read out from the memory such that a number of pixels in the main scanning direction of the image data is increased to a number of pixels in the main scanning direction of the image data to be output through the screen.

Accordingly, even when a memory that operates at relatively low drive speeds, such as DRAM, is used to randomly access an address space in the memory, the image processing device 200 is able to produce the transformed image data such as the NTSC image data that is high in image quality and according to the user need. With the above-described image processing device, a camera system such as an automobile camera system that is low in cost, small in size, and high in image quality is made available.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, the imaging system of FIG. 1 may be implemented as a camera system other than the automobile camera system such as a portable camera or a video camera.

Further, the image data to be captured or processed by the imaging system of FIG. 1 includes various types of image data including, for example, still image data, moving image data, and three-dimensional image data.

Further, the format of the image data for output through the screen is not limited to NTSC as described above referring to FIG. 7 such that any other desired format such as phase alternating line (PAL) may be used.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: an image processing device for processing image data to be output through a screen. The image processing device includes: a memory to store image data of at least one frame; read address calculating means for calculating a read address of output image data that is transformed from the input image data, the read address being used to transform the input image data read out from the memory to the output image data through coordinate conversion; memory interface means for writing in the input image data to the memory and reading out the input image data from the memory as the output image data based on the read address of the output image data calculated and input by the read address calculating means; memory access controller means for controlling reading process of the memory interface means so as to keep a number of pixels in a main scanning direction of the output image data read out from the memory to be smaller than a number of pixels in a main scanning direction of the screen; image expander means for expanding the output image data read out from the memory to generate expanded image data so as to increase the number of pixels in the main scanning direction of the output image data to the number of pixels in the main scanning direction of the screen; and image output means for encoding the expanded image data into a desired format and outputting the encoded image data through the screen.

In the above-described example, in one example, the memory access controller means counts a number of pixels in a main scanning direction of the output image data read out from the memory to obtain a counted value, and to cause the memory interface means to stop the process of reading the input image data when the counted value reaches a predetermined value so as to keep the number of pixels in the main scanning direction of the output image data read out from the memory to be smaller than a number of pixels in a main scanning direction of the screen.

In the above-described example, in one example, the memory access controller means counts a number of read addresses input by the read address calculating means to output a counted value, and to cause the read address calculating means to stop the process of calculating and inputting the read address when the counted value reaches a predetermined value so as to keep a number of pixels in a main scanning direction of the output image data read out from the memory smaller than a number of pixels in a main scanning direction of the screen.

In another example, the present invention may reside in an image processing method of processing image data to be output through a screen. The image processing method includes: storing image data of at least one frame in a memory; calculating a read address of output image data that is transformed from the input image data, the read address being used to transform the input image data read out from the memory to the output image data through coordinate conversion; writing in the input image data to the memory; reading out the input image data from the memory as the output image data based on the read address of the output image data; controlling reading operation so as to keep a number of pixels in a main scanning direction of the output image data read out from the memory to be smaller than a number of pixels in a main scanning direction of the screen; expanding the output image data read out from the memory to generate expanded image data so as to increase the number of pixels in the main scanning direction of the output image data to the number of pixels in the main scanning direction of the screen; encoding the expanded image data into a desired format; and outputting the encoded image data through the screen.

In another example, the present invention may reside in: a plurality of instructions which cause a processor to perform the above-described image processing method.

In another example, the present invention may reside in: a recording medium which stores a plurality of instructions which cause a processor to perform the above-described image processing method.

What is claimed is:

1. An image processing device for processing image data to be output through a screen, the device comprising:
    a memory configured to store input image data of at least one frame, the input image data having a plurality of coordinates;
    a read address calculator configured to calculate a read address, the read address being a coordinate of the plurality of coordinates chosen based on a transformation to be performed on the input image data through coordinate conversion;
    a memory interface configured to perform the transformation by reading the input image data from the memory as output image data without calculating addresses to read of the input image data but rather based on the read address provided by the read address calculator, the read address calculator being an integrated circuit separate from the memory interface;
    a memory access controller configured to,
        determine, for each line of the input image data, a number of pixels of the input image data to read sufficient to perform the transformation without causing an observable degradation of an image quality of the output image data based on frequency characteristics of a desired format of the output image data, the number of pixels read being less than a number of pixels in a main scanning direction of the screen, and
        control the memory interface such that for each line of the input image data, the memory interface reads the determined number of pixels of the input image data in a main scanning direction;
    an image expander configured to expand the output image data read out from the memory to generate expanded image data so as to increase the number of pixels in the main scanning direction of the output image data to the number of pixels in the main scanning direction of the screen; and
    an image output configured to encode the expanded image data in the desired format and to output the encoded image data through the screen.

2. The image processing apparatus of claim 1, wherein the memory interface includes the memory access controller.

3. The image processing apparatus of claim 1, wherein the memory includes a dynamic random access memory configured to store the input image data of at least two frames, and the memory interface writes and reads the input image data with respect to the dynamic random access memory using a double buffer method.

4. The image processing apparatus of claim 1, wherein the read address calculator includes:
    a memory configured to store a plurality of coordinate conversion tables respectively prepared for a plurality of types of the output image data, and
    the read address calculator calculates the read address of the output image data using one of the plurality of coordinate conversion tables that is selected according to an instruction received from outside of the image processing device.

5. The image processing apparatus of claim 1, wherein the image expander divides the output image data read out from the memory in the main scanning direction into a plurality of sections each having a predetermined number of pixels, applies interpolation to add a predetermined number of pixels to each of the plurality of sections so as to cause the expanded image data to have a number of pixels in the main scanning direction that is equal to the number of pixels in the main scanning direction of the screen.

6. An imaging apparatus, comprising:
    the image processing device of claim 1; and
    a sensor unit configured to obtain the image data through capturing an image of an object.

7. An image processing device for processing image data to be output through a screen, the device comprising:
    a memory configured to store input image data of at least one frame, the input image data having a plurality of coordinates;
    a read address calculator configured to calculate a read address, the read address being a coordinate of the plurality of coordinates chosen based on a transformation to be performed on the input image data through coordinate conversion;
    a memory interface configured to perform the transformation by reading the input image data from the memory as output image data without calculating addresses to read of the input image data but rather based on the read address provided by the read address calculator, the read address calculator being an integrated circuit separate from the memory interface;
    a memory access controller configured to,
        determine, for each line of the input image data, a number of pixels of the input image data to read sufficient to perform the transformation without causing an observable degradation of an image quality of the output image data based on frequency characteristics of a desired format of the output image data, the number of pixels read being less than a number of pixels in a main scanning direction of the screen, count a number of pixels in a main scanning direction of the output image data read from the memory by the memory interface, and control the reading of the input image data by the memory interface such that the counted number of pixels read from the memory is the determined number of pixels of the input image data;

an image expander configured to expand the output image data read out from the memory to generate expanded image data so as to increase the number of pixels in the main scanning direction of the output image data to the number of pixels in the main scanning direction of the screen; and an image output configured to encode the expanded image data into the desired format and to output the encoded image data through the screen.

8. The image processing apparatus of claim 7, wherein the memory interface includes the memory access controller.

9. The image processing apparatus of claim 7, wherein the memory includes a dynamic random access memory configured to store the input image data of at least two frames, and the memory interface writes and reads the input image data with respect to the dynamic random access memory using a double buffer method.

10. The image processing apparatus of claim 7, wherein the read address calculator includes a memory configured to store a plurality of coordinate conversion tables respectively prepared for a plurality of types of the output image data, and the read address calculator calculates the read address of the output image data using one of the plurality of coordinate conversion tables that is selected according to an instruction received from outside of the image processing device.

11. The image processing apparatus of claim 7, wherein the image expander divides the output image data read out from the memory in the main scanning direction into a plurality of sections each having a predetermined number of pixels, applies interpolation to add a predetermined number of pixels to each of the plurality of sections so as to cause the expanded image data to have a number of pixels in the main scanning direction that is equal to the number of pixels in the main scanning direction of the screen.

12. An imaging apparatus, comprising:
the image processing device of claim 7; and
a sensor unit configured to obtain the image data through capturing an image of an object.

13. An image processing device for processing image data to be output through a screen, the device comprising:

a memory configured to store input image data of at least one frame, the input image data having a plurality of coordinates;

a read address calculator configured to calculate a read address, the read address being a coordinate of the plurality of coordinates chosen based on a transformation to be performed on the input image through coordinate conversion;

a memory interface configured to perform the transformation by reading the input image data from the memory as output image data without calculating addresses to read of the input image data but rather based on the read address provided by the read address calculator, the read address calculator being an integrated circuit separate from the memory interface;

a memory access controller configured to, determine, for each line of the input image data, a number of pixels of the input image data to read sufficient to perform the transformation without causing an observable degradation of an image quality of the output image data based on frequency characteristics of a desired format of the output image data, the number of pixels read being less than a number of pixels in a main scanning direction of the screen, count a number of read addresses provided to the memory access controller by the read address calculator to generate a counted value, and control the providing of the read addresses by the read address calculator to the memory interface such that the memory interface only reads the determined number of pixels of the input image data an image expander configured to expand the output image data read out from the memory to generate expanded image data so as to increase the number of pixels in the main scanning direction of the output image data to the number of pixels in the main scanning direction of the screen; and an image output configured to encode the expanded image data into the desired format and to output the encoded image data through the screen.

14. The image processing device of claim 13, wherein the memory interface includes the memory access controller.

15. The image processing device of claim 13, wherein the memory includes a dynamic random access memory configured to store the input image data of at least two frames, and the memory interface writes and reads the input image data with respect to the dynamic random access memory using a double buffer method.

* * * * *